(12) United States Patent
Pillai et al.

(10) Patent No.: US 9,843,625 B2
(45) Date of Patent: Dec. 12, 2017

(54) SYSTEM AND METHOD FOR AGGREGATING AND PROVIDING DATA FROM ENTERPRISE SYSTEMS TO MOBILE DEVICES

(71) Applicant: Cognizant Technology Solutions India Pvt. Ltd., Chennai (IN)

(72) Inventors: Parasu Pillai, Chennai (IN); Narayn Sridharan, Chennai (IN); Manish Chadha, Punjab (IN)

(73) Assignee: Cognizant Technology Solutions India Pvt. Ltd. (IN)

( * ) Notice: Subject to any disclaimer, the term of this patent is extended or adjusted under 35 U.S.C. 154(b) by 168 days.

(21) Appl. No.: 14/299,028

(22) Filed: Jun. 9, 2014

(65) Prior Publication Data

US 2015/0256603 A1   Sep. 10, 2015

(30) Foreign Application Priority Data

Mar. 10, 2014   (IN) ............................ 1236/CHE/2014

(51) Int. Cl.
*G06F 17/30* (2006.01)
*H04L 29/08* (2006.01)
(Continued)

(52) U.S. Cl.
CPC .............. *H04L 67/10* (2013.01); *G06F 9/541* (2013.01); *H04W 4/003* (2013.01)

(58) Field of Classification Search
CPC ......... H04L 67/10; H04L 67/42; H04L 29/06; H04L 29/0604; G06F 9/52; G06F 9/541;
(Continued)

(56) References Cited

U.S. PATENT DOCUMENTS 7,721,193 B2    5/2010   Upton
7,860,827 B1 *  12/2010  Ayyad ............... G06F 17/30578
                                                        707/610
(Continued)

FOREIGN PATENT DOCUMENTS

WO        2005103956 A1    11/2005

*Primary Examiner* — Greta Robinson
(74) *Attorney, Agent, or Firm* — Lerner, David, Littenberg, Krumholz & Mentlik, LLP

(57) ABSTRACT

A system and computer-implemented method for aggregating and providing data from one or more enterprise systems to one or more mobile devices is provided. The system comprises one or more enterprise systems configured to store data pertaining to one or more enterprises. The system further comprises a middleware server, in communication with one or more mobile devices, configured to connect with the one or more enterprise systems based on a predefined information architecture. Further, the middleware server is configured to extract the data from the one or more connected enterprise systems. Furthermore, the middleware server is configured to transform the extracted data into one or more mobile compatible formats. In addition, the middleware server is configured to send the transformed data to the one or more mobile devices. The system further comprises one or more mobile devices configured to locally store and render the transformed data.

20 Claims, 6 Drawing Sheets

(51) Int. Cl.
*G06F 9/54* (2006.01)
*H04W 4/00* (2009.01)

(58) Field of Classification Search
CPC ......... G06F 17/30017; G06F 17/30067; G06F 17/30575; G06F 17/30592; H03M 7/30; H04W 4/003
USPC ......... 707/602, 620, 621, 687, 809; 709/217
See application file for complete search history.

(56) References Cited

U.S. PATENT DOCUMENTS

| | | | |
|---|---|---|---|
| 8,041,760 B2* | 10/2011 | Mamou | G06F 17/30563 707/602 |
| 8,296,258 B2* | 10/2012 | Rand | G06Q 30/06 707/602 |
| 2004/0224675 A1* | 11/2004 | Puskoor | H04L 29/06 455/419 |
| 2004/0267834 A1* | 12/2004 | Sasaki | G06F 17/30578 |
| 2011/0282969 A1 | 11/2011 | Iyer et al. | |
| 2014/0004838 A1* | 1/2014 | Sathyan | H04W 4/001 455/414.3 |

\* cited by examiner

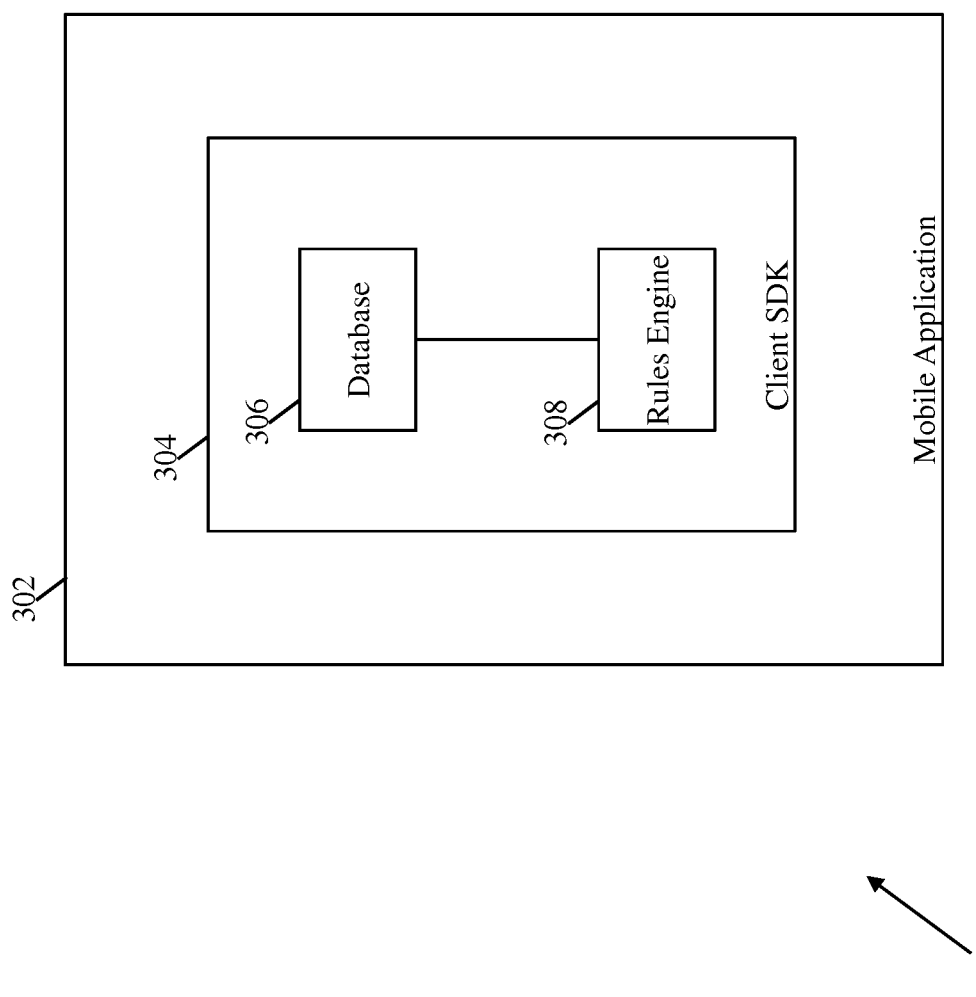

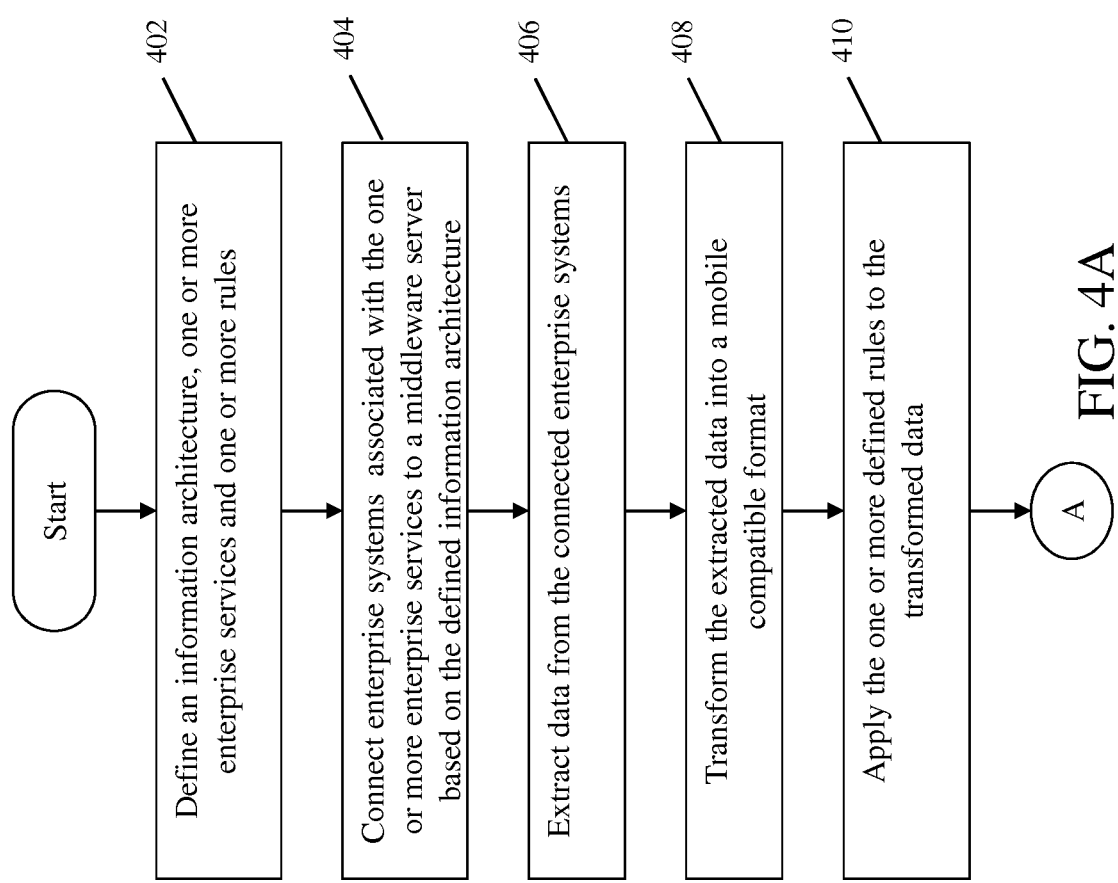

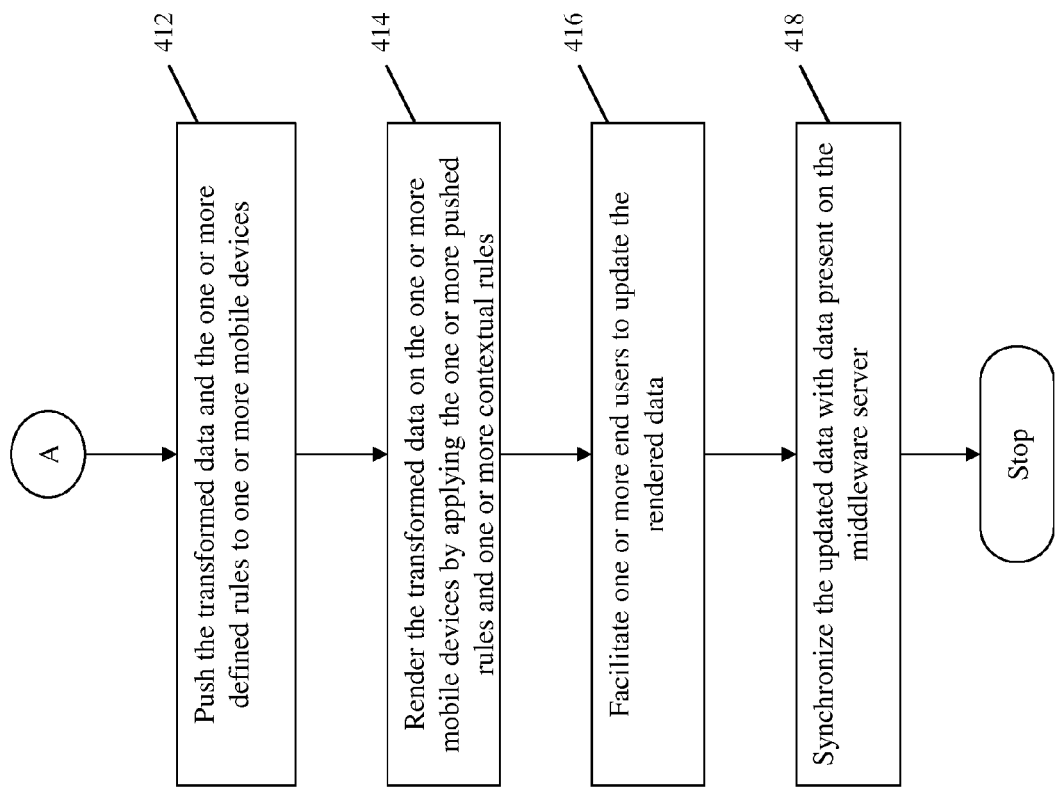

SYSTEM AND METHOD FOR AGGREGATING AND PROVIDING DATA FROM ENTERPRISE SYSTEMS TO MOBILE DEVICES

FIELD OF THE INVENTION

The present invention relates generally to aggregating data from enterprise's backend systems. More particularly, the present invention provides a system and method for aggregating and providing data from enterprise systems to mobile devices.

BACKGROUND OF THE INVENTION

With the advancements in communication technology and ever expanding businesses, the amount of business data that has to be managed has increased manifold. It is critical for the enterprises and businesses to timely provide the business data to employees so that the employees make effective and well informed business decisions. It is also necessary for the enterprises to ensure that employees are able to access the business data from anywhere and at anytime in a convenient manner.

Conventionally, various systems and methods exist for providing business data and enterprise applications to the employees. For example, enterprises provide the business data and enterprise applications to the employees through mobile devices. The enterprises use middleware frameworks to extract the business data from the enterprise systems and convert the extracted data to mobile-compatible format. However, these middleware frameworks can be used only for a specific enterprise application. As a result, the enterprises require new middleware framework whenever a new enterprise application is developed. Also, the existing middleware frameworks are not designed to capture data context and are, therefore, unable to present data in a readily consumable format on the mobile devices. In addition, aligning data in a suitable format requires a lot of development effort thereby increasing time to launch the enterprise applications. Furthermore, the existing middleware frameworks do not capture business rules for validating the extracted business data. Consequently, the mobile devices are dependent on network connectivity for validating the business data. In addition, the existing middleware frameworks do not filter the extracted business data which makes the enterprise applications slow on low bandwidth network. Also, existing middleware frameworks are dependent on network connectivity and do not support caching of business data on the mobile devices due to which data is not available if connection with the enterprise systems is not established. This causes data integrity issues and latest information is not timely available to end users.

In light of the above, there is a need for an efficient system and method for aggregating and providing data from one or more enterprise systems to mobile devices. Further, there is a need for a system and method that combines the aggregated data with contextual information and provides latest information to one or more end users to take critical decisions. Furthermore, there is a need for a system and method that stores the business data locally at the mobile devices thereby removing network dependency for accessing the business data. Also, there is a need for a system and method that presents the aggregated data in a contextually suitable format on the mobile devices. In addition, there is a need for a system and method that captures business rules for validating the aggregated data. Further, there is a need for a system and method that is cost and time efficient, improves employee efficiency and facilitates effective decision making.

SUMMARY OF THE INVENTION

A system and computer-implemented method for aggregating and providing data from one or more enterprise systems to one or more mobile devices is provided. The system comprises one or more enterprise systems configured to store data pertaining to one or more enterprises. The system further comprises a middleware server, in communication with one or more mobile devices, configured to connect with the one or more enterprise systems based on a predefined information architecture. Further, the middleware server is configured to extract the data from the one or more connected enterprise systems. Furthermore, the middleware server is configured to transform the extracted data into one or more mobile compatible formats. In addition, the middleware server is configured to send the transformed data to the one or more mobile devices. The system further comprises one or more mobile devices configured to locally store and render the transformed data.

In an embodiment of the present invention, the middleware server is further configured to define one or more business rules and one or more generic rules. In an embodiment of the present invention, the middleware server is further configured to send at least one of: the one or more defined business rules and the one or more defined generic rules to the one or more mobile devices. In an embodiment of the present invention, the transformed data is sent to the one or more mobile devices after applying the one or more defined business rules and the one or more defined generic rules.

In an embodiment of the present invention, each of the one or more mobile devices comprises a client Software Development Kit (SDK) configured to receive the transformed data, the one or more defined business rules and the one or more defined generic rules from the middleware server. The client SDK is further configured to render the transformed data on the one or more mobile devices by applying the one or more defined generic rules and one or more contextual rules. Furthermore, the client SDK is configured to facilitate one or more end users to update the rendered data. In addition, the client SDK is configured to validate the rendered data using the one or more received business rules. Also, the client SDK is configured to synchronize the updated data with data present on the middleware server.

In an embodiment of the present invention, the one or more contextual rules are created by capturing at least one of: device context parameters, application context parameters, rules context parameters and security context parameters and further wherein the one or more contextual rules facilitate rendering contextually relevant data on the one or more mobile devices. In an embodiment of the present invention, rendering the transformed data on the one or more mobile devices further comprises rendering additional information along with the transformed data, wherein the additional information comprises at least one of: data associated with mobile device functionalities and data from one or more external sources.

In an embodiment of the present invention, the middleware server transforms the extracted data by parsing the extracted data and processing the parsed data to obtain the one or more mobile compatible formats. In an embodiment of the present invention, the one or more mobile compatible formats include at least a JavaScript Object Notation (JSON) format.

The computer-implemented method for aggregating and providing data from one or more enterprise systems to one or more mobile devices, via program instructions stored in a memory and executed by a processor, comprises connecting one or more enterprise systems to a middleware server based on a predefined information architecture. The computer-implemented method further comprises extracting data from the one or more connected enterprise systems. Furthermore, the computer-implemented method comprises transforming the extracted data into one or more mobile compatible formats. In addition, the computer-implemented method comprises sending the transformed data to the one or more mobile devices. Also, the computer-implemented method comprises storing and rendering the transformed data on the one or more mobile devices. In an embodiment of the present invention, the computer-implemented method further comprises defining one or more business rules and one or more generic rules. In an embodiment of the present invention, the computer-implemented method further comprises the step of sending the one or more business rules and the one or more generic rules to the one or more mobile devices. In an embodiment of the present invention, the transformed data is sent to the one or more mobile devices after applying the one or more defined business rules and the one or more defined generic rules.

In an embodiment of the present invention, the computer-implemented method further comprises receiving the transformed data, the one or more business rules and the one or more generic rules by the one or more mobile devices. Furthermore, the computer-implemented method comprises rendering the transformed data by applying the one or more generic rules and one or more contextual rules. The computer-implemented method also comprises facilitating one or more end users to update the rendered data. In addition, the computer-implemented method comprises validating the rendered data using the one or more received business rules. The computer-implemented method further comprises synchronizing the updated data with data present on the middleware server.

In an embodiment of the present invention, the one or more contextual rules are created by capturing at least one of: device context parameters, application context parameters, rule context parameters and security context parameters by the one or more mobile devices and further wherein the one or more contextual rules facilitate rendering contextually relevant data on the one or more mobile devices.

In an embodiment of the present invention, rendering the transformed data comprises rendering additional information along with the transformed data, wherein the additional information comprises at least one of: data associated with mobile device functionalities and data from one or more external systems. In an embodiment of the present invention, the rendered data is validated using the one or more received business rules. In an embodiment of the present invention, the step of transforming the extracted data comprises parsing the extracted data and processing the parsed data to obtain the one or more mobile compatible formats.

A computer program product for aggregating and providing data from one or more enterprise systems to one or more mobile devices is provided. The computer program product comprising a non-transitory computer-readable medium having computer-readable program code stored thereon, the computer-readable program code comprising instructions that when executed by a processor, cause the processor to connect one or more enterprise systems to a middleware server based on a predefined information architecture. The processor further extracts data from the one or more connected enterprise systems. Furthermore, the processor transforms the extracted data into one or more mobile compatible formats. In addition, the processor sends the transformed data to the one or more mobile devices. Also, the processor stores and renders the transformed data on the one or more mobile devices.

A system for aggregating and providing data from one or more enterprise systems to one or more mobile devices is provided. The system comprises a Central Processing and Design Module (CPDM) configured to connect with the one or more enterprise systems based on a predefined information architecture. The system further comprises an integration server, in communication with the CPDM, configured to extract the data from the one or more connected enterprise systems. Furthermore, the system comprises a transformation engine, within the CPDM, configured to transform the extracted data into one or more mobile compatible formats. In addition, the system comprises a cache server, in communication with the CPDM, configured to send the transformed data to the one or more mobile devices, wherein the one or more mobile devices are configured to locally store and render the transformed data.

BRIEF DESCRIPTION OF THE ACCOMPANYING DRAWINGS

The present invention is described by way of embodiments illustrated in the accompanying drawings wherein:

FIG. 3 is a detailed block diagram of a mobile device, in accordance with an embodiment of the present invention;

FIGS. 4A and 4B represent a flowchart illustrating a method for aggregating and providing data from enterprise systems to mobile devices, in accordance with an embodiment of the present invention.

DETAILED DESCRIPTION OF THE INVENTION

A system and method for aggregating and providing data from one or more enterprise systems to mobile devices is described herein. The invention provides for a system and method that seamlessly connects to the one or more enterprise systems, aggregates data from the one or more enterprise systems, supplements the aggregated data with information from one or more external systems and provides the aggregated data and the supplemental information in a mobile compatible format to enable one or more end users to take critical decisions. The invention further provides for a system and method that captures data context and presents the data in a readily consumable format. The invention provides for a system and method that captures business rules for validating the aggregated data. Furthermore, the invention provides for a system and method that selectively filters the extracted data to provide relevant data to the end user and save network bandwidth. Also, the invention provides for a system and method that allows caching of data which when combined with contextual data provides latest information which is more valuable to the end users.

The following disclosure is provided in order to enable a person having ordinary skill in the art to practice the invention. Exemplary embodiments are provided only for illustrative purposes and various modifications will be readily apparent to persons skilled in the art. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

The present invention would now be discussed in context of embodiments as illustrated in the accompanying drawings.

Figure 1:
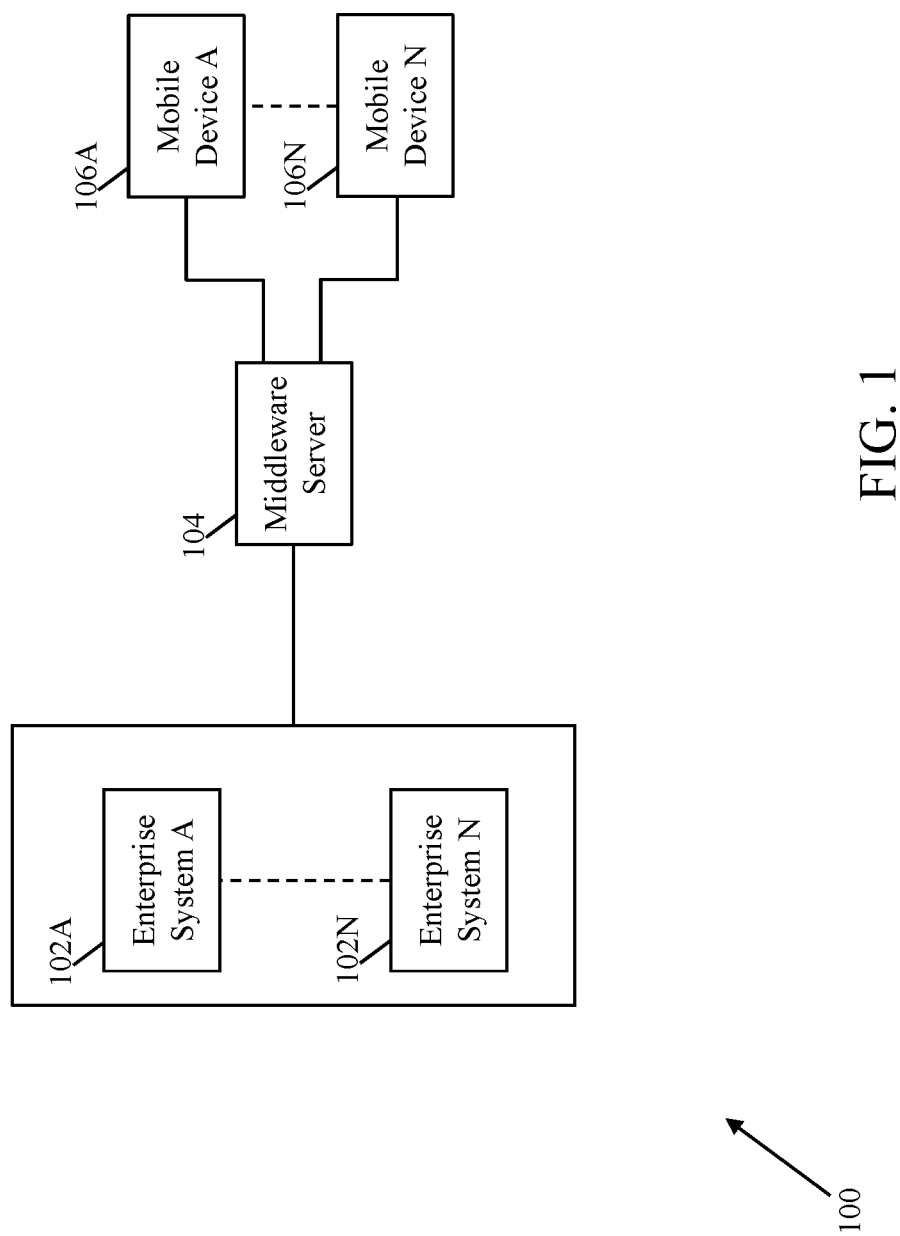
FIG. 1 is a block diagram illustrating a system for aggregating and providing data from enterprise systems to mobile devices, in accordance with an embodiment of the present invention.

FIG. 1 is a block diagram illustrating a system for aggregating and providing data from one or more enterprise systems to one or more mobile devices, in accordance with an embodiment of the present invention. The system 100 comprises one or more enterprise systems 102A-NA-N, a middleware server 104 and one or more mobile devices 106A-N.

The one or more enterprise systems 102A-N are backend systems that support business processes, information flows, reporting and data analytics of an enterprise. The one or more enterprise systems 102A-N are configured to store data pertaining to one or more enterprises. In an embodiment of the present invention, the one or more enterprise systems 102A-N include, but not limited to, Enterprise Resources Planning (ERP) systems, Customer Relationship Management (CRM) systems and enterprise servers and databases. In an embodiment of the present invention, the one or more enterprise systems 102A-N are connected to the middleware server 104.

The middleware server 104 is configured to connect and aggregate the data from the one or more enterprise systems 102A-N. The middleware server 104 is further configured to provide the aggregated data to the one or more mobile devices 106A-N. In an embodiment of the present invention, the middleware server 104 resides in a cloud computing environment (not shown). In another embodiment of the present invention, the middleware server 104 is a physical server. In an exemplary embodiment of the present invention, the middleware server 104 is designed using Node.js Stack and Mongo DB.

In an embodiment of the present invention, the middleware server 104 comprises an integration server configured to extract the data from the one or more enterprise systems 102A-N. The middleware server 104 also comprises a transformation engine which transforms the aggregated data into a mobile compatible format. The middleware server 104 further comprises a cache server which temporarily stores the transformed data. The transformed data is then pushed and stored locally in a database within the one or more mobile devices 106A-N. In an embodiment of the present invention, storing the transformed data within the one or more mobile devices 106A-N facilitates in removing dependency on network connectivity with respect to the one or more enterprise systems 102A-N (FIG. 1) when one or more end users need to access the transformed data. The stored transformed data is rendered on the one or more mobile devices. In an embodiment of the present invention, the one or more end users are employees of the enterprise that need to access the transformed data on one or more enterprise applications via the one or more mobile devices 106A-N. In an embodiment of the present invention, the one or more mobile devices 106A-N include, but not limited to, smartphones, tablets, smart watches, wearable computing devices, laptops, personal digital assistants (PDAs) and blackberry.

In various embodiments of the present invention, the system 100 can be designed and customized for various organizations and industries including, but not limited to, insurance, banking, retail, utilities and manufacturing.

Figure 2:
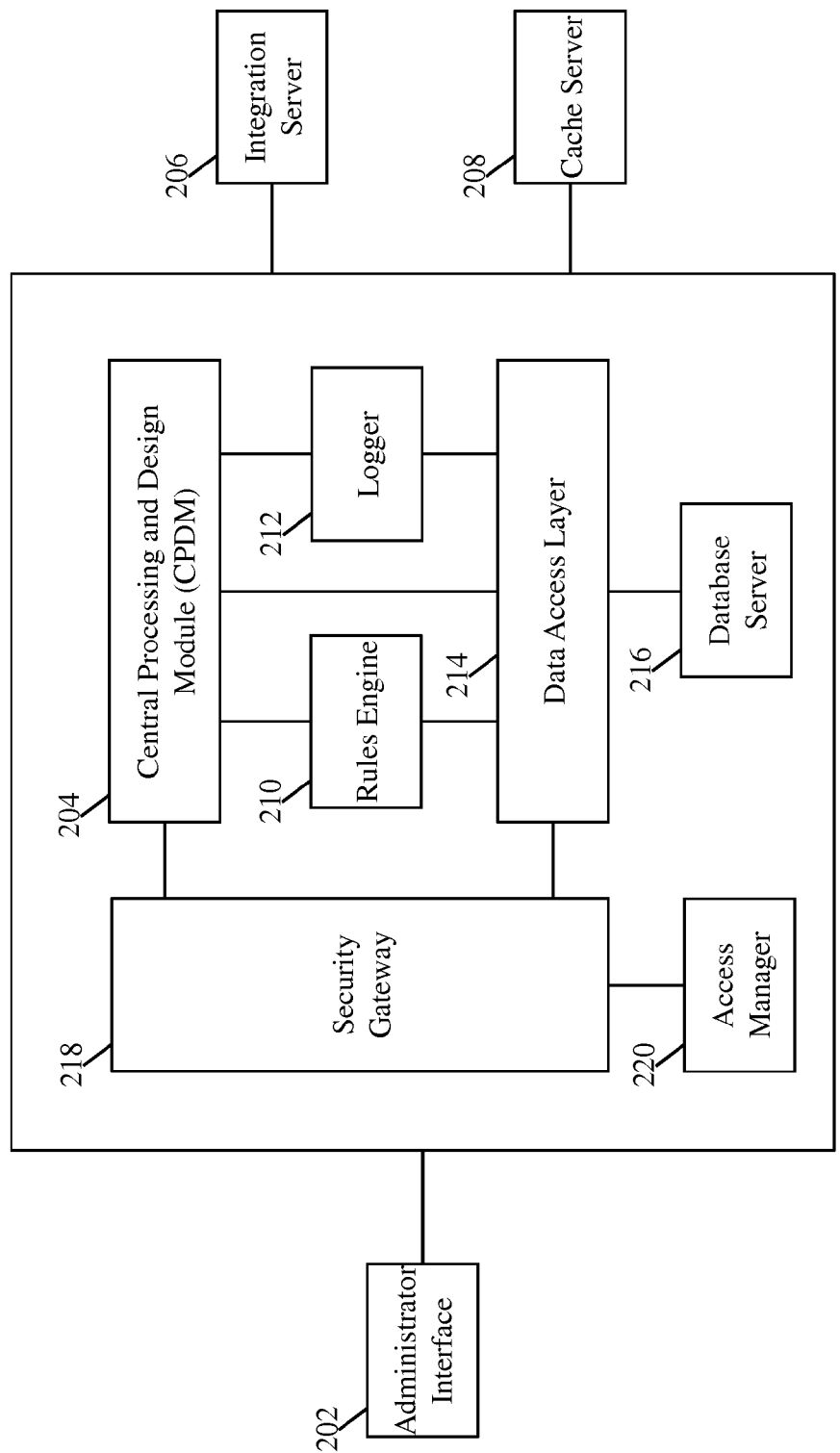
FIG. 2 is a detailed block diagram of a middleware server for aggregating and providing data from enterprise systems to mobile devices, in accordance with an embodiment of the present invention.

FIG. 2 is a detailed block diagram of the middleware server for aggregating and providing data from enterprise systems to mobile devices, in accordance with an embodiment of the present invention. The middleware server 200 comprises an administrator interface 202, a Central Processing and Design Module (CPDM) 204, an integration server 206, a cache server 208, a rules engine 210, a logger 212, a data access layer 214, a database server 216, a security gateway 218 and an access manager 220.

The administrator interface 202 is configured to provide options to one or more administrators to define information architecture, one or more enterprise services and one or more rules. Further, the information architecture provides logical structure to the data required on the one or more mobile devices 106A-N (FIG. 1) associated with the one or more defined enterprise services and the one or more defined rules to facilitate extracting and providing the data to the one or more end users via one or more enterprise applications. Furthermore, the information architecture maps information and attributes to a specific enterprise service and enterprise application which can be accessed by a specific group of end users on the one or more mobile devices 106A-N (FIG. 1). In an exemplary embodiment of the present invention, the one or more administrators defines the information architecture such that the one or more end users such as, but not limited to, sales executive of the enterprise is provided with customer details extracted from a backend CRM system of the enterprise. Further, the sales executive may access the customer details via a specific enterprise application customized for use and access by sales executives on the mobile device 106A-N (FIG. 1).

The CPDM 204 is configured to set up and connect the one or more enterprise systems 102A-N (FIG. 1) with the middleware server 200 based on the defined information architecture. Further, the CPDM 204 also facilitates the one or more administrators to create, configure and customize the one or more defined rules. In an embodiment of the present invention, the one or more defined rules comprise one or more business rules and one or more generic rules.

The one or more business rules are used for validating the data. The one or more generic rules are used for, but not limited to, generating presentation layer, compressing data, filtering data, changing data synchronization priorities based on bandwidth availability, extending enterprise applications and mobile device capabilities, facilitating interaction between two or more enterprise applications and two or more mobile devices using the enterprise application, invoking one enterprise application through another enterprise application and passing information between two or more enterprise applications.

The CPDM 204 is further configured to facilitate the one or more administrators to build user interface of the one or more enterprise applications and ensure appropriate representation of the data on the one or more enterprise applications. In an embodiment of the present invention, the CPDM 204 provides one or more presentation templates for suitable representation of different types of data on the one or more mobile devices 106A-N (FIG. 1). In an embodiment of the present invention, the one or more administrators associate the one or more presentation templates to objects and data model. In another embodiment of the present invention, the one or more administrators select a presentation template for the one or more enterprise applications via the administrator interface 202. Further, the CPDM 204 facilitates the one or more administrators to create and configure the one or more generic rules for presentation layer generation via the administrator interface 202. The presentation templates are used for building the presentation layer and suitably rendering the data on the presentation layer using the one or more generic rules for presentation layer generation. In an embodiment of the present invention, the one or more generic rules related to presentation layer generation include rules related to, but not limited to, role based presentation layer components, interface layout, device specific layout and data plan specific layout. In an embodiment of the present invention, rules related to data plan specific layout facilitate rendering the data in a suitable layout on the mobile device based on the type of data plan used by the mobile device. In an exemplary embodiment of the present invention, if the mobile device is connected to a high bandwidth network then the data is presented on the mobile device using rich user interface components.

The integration server 206 is configured to extract the data from the one or more enterprise systems 102A-N (FIG. 1) connected to the middleware server 200. In an embodiment of the present invention, the integration server 206 extracts the data based on one or more triggers associated with the one or more enterprise services. In an embodiment of the present invention, the integration server 206 extracts the data using web service. The CPDM 204 then transforms the extracted data into a mobile compatible format using a transformation engine (not shown) and a parser (not shown). The parser (not shown) parses the extracted data. The parsed data is then processed by the transformation engine (not shown) to obtain the one or more mobile compatible formats. In an embodiment of the present invention, the extracted data is converted into JavaScript Object Notation (JSON) format by the transformation engine (not shown).

The cache server 208 is an intermediate server configured to maintain cache for the transformed data received from the CPDM 204. Further, the cache server 208 facilitates in pushing the transformed data and the one or more defined rules to the one or more mobile devices 106A-N (FIG. 1). In an embodiment of the present invention, the transformed data is sent to the one or more mobile devices after applying the one or more defined rules. In an exemplary embodiment of the present invention, the cache server 208 pushes the transformed data to the one or more mobile devices 106A-N (FIG. 1) in the JSON format through a Representational State Transfer (REST) protocol. In an embodiment of the present invention, the cache server 208 pushes the transformed data and the one or more rules to the one or more mobile devices based on a request from the one or more mobile devices 106A-N (FIG. 1).

In an embodiment of the present invention, the cache server 208 maintains synchronization state for data records with the one or more mobile devices 106A-N (FIG. 1). The data record may be synchronized with the one or more mobile devices 106A-N (FIG. 1) by the cache server 208. Further, the synchronization state is verified and updated by the cache server 208 at the time of synchronizing data with the one or more mobile devices 106A-N (FIG. 1).

In an embodiment of the present invention, the administrator interface 202 provides options to the one or more administrators to configure cache expiry interval and cache purging interval for the cache server 208. The cache expiry interval and cache purging interval facilitate in clearing the data on the cache server 208 and the one or more mobile devices 106A-N (FIG. 1) at predefined intervals. In an embodiment of the present invention, the cache expiry and cache purging intervals are associated with the data and are configured by the one or more administrators. In an exemplary embodiment of the present invention, the one or more administrator may configure cache expiry time as 6:00 P.M. such that all the data on the cache server and the one or more mobile devices is either temporarily or permanently deleted at 6:00 PM. In an embodiment of the present invention, the one or more administrators, via the administrator interface 202, may purge the data on at least one of: the cache server 208 and the one or more mobile devices 106A-N (FIG. 1). In an embodiment of the present invention, the inbuilt logical relationship of different attributes associated with the transformed data ensures that when the data is purged for one of the attributes then it is automatically purged for all related data sets to ensure data integrity and data security.

The rules engine 210 is configured to facilitate storing the one or more business rules defined by the one or more administrators. The one or more business rules stored in the rules engine 210 are configurable, customizable and extendable for the one or more enterprise applications. In an embodiment of the present invention, the one or more administrators may configure and customize the one or more business rules for a new enterprise application via the administrator interface 202. In an embodiment of the present invention, the rules engine 210 facilitates pushing the one or more business rules to the one or more mobile devices 106A-N (FIG. 1) via the cache server 208. At the one or more mobile devices 106A-N (FIG. 1), the pushed one or more rules reside as rules templates and are used for validating the transformed data.

The rules engine 210 also stores the one or more generic rules defined by the one or more administrators via the CPDM 204. The cache server 208 communicates with the rules engine 210 for accessing the one or more generic rules that are applied to the transformed data prior to sending the transformed data to the one or more mobile devices 106A-N (FIG. 1). In an embodiment of the present invention, the rules engine 210 compresses and filters the transformed data by applying the one or more generic rules stored in the rules engine 210. The rules engine 210 uses one or more compression techniques for compressing the transformed data. In another embodiment of the present invention, the rules engine 210 selectively filters the transformed data to facilitate the cache server 208 to only send the transformed data that is requested or required by the one or more mobile devices 106A-N (FIG. 1).

In an embodiment of the present invention, generic rules related to data synchronization facilitate the cache server 208 in sending only compressed and filtered data to the one or more mobile devices 106A-N (FIG. 1) when the one or more mobile devices 106A-N (FIG. 1) are connected using low bandwidth network. In another embodiment of the present invention, generic rules related to data synchronization facilitate the cache server 208 in sending bulky data to the one or more mobile devices when the one or more mobile devices 106A-N (FIG. 1) are connected using high bandwidth network.

In an embodiment of the present invention, the rules engine 210 facilitates the one or more administrators to create and push one or more offline checklists to the one or more mobile devices 106A-N (FIG. 1) via the administrator interface 202. The one or more offline checklists are prerequisites associated with the one or more enterprise services. The offline checklists facilitate in reducing errors and improving employee productivity.

The logger 212 is configured to maintain a log of all transactions between various components of middleware server 200 and track all the transactions and data flow. The logger 212 also captures various requests and responses provided by various services involved in the data flow. In an embodiment of the present invention, the logger 212 facilitates the one or more administrators in tracking flow failure which further facilitates troubleshooting.

The data access layer 214 is configured to maintain and facilitate access to data stored in the database server 216. The data stored in the database server 216 includes, but not limited to, rules, data manifests and user interface (UI) templates. In an embodiment of the present invention, the data is stored in non-relational format and de-normalized form in multiple servers within the database server 216 and is pulled as and when required through data access layer 214. In an embodiment of the present invention, the data access layer 214 uses one or more Application Programming Interfaces (API) for communicating with the various components of the middleware server 200.

The database server 216 stores the extracted data from the one or more enterprise systems 102A-N (FIG. 1) and transactional data associated with the middleware server 200. The database server is accessed by various components of the middleware server 200 through data access layer 214. In an embodiment of the present invention, the database server 216 also acts as the cache server 208.

The security gateway 218 is configured to ensure security of all the data during transit and storage. The security gateway 218 also controls incoming and outgoing network traffic and data exchange. The security gateway 218 employs various security measures including, but not limited to, encrypting data in offline storage, encrypting data during transfers, using token based approach for information exchange, checking for malicious content and object tags, forbidding requests containing malicious content and object tags, handling Distributed Denial-Of-Service (DDOS) attacks, Cross Site Request Forgery (CSRF) attacks, Cross-Site Scripting (XSS) attacks, using Secure Shell (SSH) protocol for authentication, using OAuth 2.0 based protocol, using encrypted transport for selected fields, using SSH File Transfer Protocol (SFTP) and Secure Copy Protocol (SCP) for secure file transfers, implementing digital certificate based data transfer techniques, providing role based authorization, implementing time bound data expiration and role based data expiration and implementing field specific encrypted data store.

The access manager 220 is configured to authorize and authenticate individuals, applications and systems requesting access to the middleware server 200. The access manager 206 is further configured to authenticate and authorize the one or more end users to access the transformed data via the one or more enterprise applications on the one or more mobile devices 106A-N (FIG. 1). In an embodiment of the present invention, the access manager 220 integrates with Enterprise Identity Management (EIM) system of the enterprise.

FIG. 3 is a detailed block diagram of the mobile device, in accordance with an embodiment of the present invention. The mobile device 300 comprises a mobile application 302 having a client Software Development Kit (SDK) 304 which communicates with the middleware server 200 (FIG. 2).

The mobile application 302 is configured to provide one or more options to the one or more end users to access and update the transformed data received by the mobile device 300 from the middleware server 200 (FIG. 2). In an embodiment of the present invention, the one or more end users send requests to the middleware server 200 (FIG. 2) for receiving the transformed data via the mobile application 302. In another embodiment of the present invention, the mobile application 302 facilitates the one or more end users to configure cache expiry interval and cache purging interval for the cache server 208 (FIG. 2). In an embodiment of the present invention, the mobile application 302 is an enterprise application provided by the enterprise to facilitate the one or more end users to access enterprise data.

The client SDK 304 residing within the mobile application 302 facilitates interaction with the middleware server 200 (FIG. 2). The client SDK 304 further comprises a database 306 and a rules engine 308.

The database 306 is configured to receive the transformed data from the cache server 208 (FIG. 2). Further, the database 306 serves as a local repository within the mobile device 300 and stores the received data. Furthermore, the one or more end users can view and update the received data via the mobile application 302 even when the mobile device 300 is not connected to the network. The database 306 also facilitates synchronizing the updated data with data present on the middleware server 200 (FIG. 2) when the mobile device 300 connects to the network (not shown). The middleware server 200 (FIG. 2) further synchronizes with the one or more enterprise systems 102A-N (FIG. 1). In an embodiment of the present invention, the database 306 synchronizes the updated data with the middleware server 200 (FIG. 2) by sending asynchronous updates. In an embodiment of the present invention, the database 306 maintains synchronization information and status. The synchronization information and status are used by the database 306 for recognizing expired cache.

The rules engine 308 is configured to receive the one or more business rules and the one or more generic rules from the rules engine 210 (FIG. 2) via the cache server 208 (FIG. 2). In an embodiment of the present invention, the one or more business rules reside as rules templates within the rules engine 308. Further, the stored rules templates create dynamic business data validation rules for validating the transformed data received from the cache server 208 (FIG. 2) by the database 306. The dynamic business data validation rules facilitate validating the transformed data on the mobile device 300 thereby ensuring that the mobile application 302 need not send data validation requests to the one or more enterprise systems 102A-N (FIG. 1). Also, the transformed data is validated even when the mobile device 300 is not connected to the network (not shown) thereby removing dependency on network connectivity with respect to the one or more enterprise systems 102 A-N (FIG. 1). In an embodiment of the present invention, the rules engine 308 along with the database 306 maintains update details, data synchronization priorities, data synchronization sequence and state of the mobile device's storage.

The rules engine 308 is further configured to generate presentation layer for the mobile application 302 using the one or more generic rules related to presentation layer generation and the one or more presentation templates. In an embodiment of the present invention, the rules engine 308 facilitates in rendering the transformed data in a readily consumable format on the one or more enterprise applications by applying the one or more defined generic rules and one or more contextual rules. In an exemplary embodiment of the present invention, the rules engine 308 applies rich user interface components if the mobile device 300 is connected to a high bandwidth network based on a corresponding rule related to presentation layer generation. In another embodiment of the present invention, the rules engine 308 generates page layout based on the type of mobile device 300 used by the one or more end users using a corresponding rule related to the layout of the presentation layer.

The rules engine 308 augments additional information associated with various mobile device functionalities such as, but not limited to, Global Positioning System (GPS), augmented reality, camera and maps with the transformed data received from the middleware server 200 (FIG. 2) and renders on the one or more mobile devices 106A-N (FIG. 1) to facilitate the one or more end users in effective decision making. In an embodiment of the present invention, the rules engine 308 also captures device context parameters, application context parameters, rule context parameters and security context parameters to create one or more contextual rules. The one or more contextual rules are used by the client SDK 304 to provide contextually relevant transformed data to the one or more end users. The one or more contextual rules also facilitate the developer to optimally leverage device capabilities with minimal coding efforts.

In an embodiment of the present invention, the device context parameters include, but not limited to, device location, device coordinates, distance from specified location, time zone, device type, device Operating System (OS), device OS version, device manufacturer, device International Mobile Station Equipment Identity (IMEI) number, device ID, device usage, network type and network carrier. In an embodiment of the present invention, the application context parameters include, but not limited to, changing application behavior based on runtime rules or configuration. In an embodiment of the present invention, the rule context parameters include, but not limited to, executing/blocking a rule based on another rule. In an embodiment of the present invention, the security context parameters include, but not limited to, status of the device as blacklisted or whitelisted and number of requests from the device. In an embodiment of the present invention, the one or more contextual rules include, but not limited to, enabling or disabling application functionalities based on device location, device type and device OS, prioritizing data synchronization based on device network connectivity, enabling or disabling application libraries based on device type and device OS and performing one or more actions based on device location.

In an embodiment of the present invention, the rules engine 308 supplements the transformed data with additional information from one or more external systems such as, but not limited to, World Wide Web and renders on the one or more mobile devices 106A-N (FIG. 1) to provide more meaningful information to the one or more end users. In an embodiment of the present invention, the additional information from the one or more external systems include, but not limited to, maps, weather updates, traffic updates, stock updates and web queries.

FIGS. 4A and 4B represent a flowchart illustrating a method for aggregating and providing data from enterprise systems to mobile devices, in accordance with an embodiment of the present invention.

At step 402, one or more administrators define an information architecture, one or more rules and one or more enterprise services. In an embodiment of the present invention, the one or more administrators include, but not limited to, system analysts and developers. The information architecture provides logical structure to data associated with the one or more defined enterprise services and the one or more defined rules to facilitate extracting and providing the data to one or more end users on the one or more mobile devices.

In an embodiment of the present invention, the one or more end users include, but not limited to, employees of an enterprise. In an embodiment of the present invention, the one or more end users avail the one or more enterprise services and access the data from one or more enterprise systems via one or more enterprise applications on the one or more mobile devices. In an embodiment of the present invention, the one or more mobile devices include, but not limited to, smartphones, tablets, smart watches, wearable computing devices, laptops, personal digital assistants (PDAs) and blackberry.

At step 404, the one or more enterprise systems associated with the one or more enterprise services are connected to a middleware server based on the defined information architecture. The one or more enterprise systems store data pertaining to one or more enterprises. In an embodiment of the present invention, the one or more enterprise systems include, but not limited to, Enterprise Resources Planning (ERP) systems, Customer Relationship Management (CRM) system and Enterprise servers and databases.

At step 406, the data is extracted from the one or more connected enterprise systems by the middleware server. In an embodiment of the present invention, the data is extracted based on one or more triggers associated with the one or more enterprise services. At step 408, the extracted data is transformed into a mobile compatible format. In an embodiment of the present invention, the step of transformation comprises parsing the extracted data. The parsed data is then processed to obtain the appropriate mobile compatible format. In an embodiment of the present invention, the extracted data is transformed to a JavaScript Object Notation (JSON) format. Once the extracted data is transformed, the transformed data is temporarily stored in an intermediate server.

At step 410, the one or more defined rules are applied to the transformed data. In an embodiment of the present invention, the one or more defined rules are applied to the transformed data to send relevant data to the one or more mobile devices. In an embodiment of the present invention, the one or more defined rules comprise one or more business rules. The one or more business rules are used for validating the data. In an embodiment of the present invention, the one or more business rules facilitate pushing relevant data based on role and position of the one or more end users in the enterprise. In an exemplary embodiment, customer details of a specific region are pushed to the mobile devices of the customer executives of the specific region only and are not pushed to the mobile devices of customer executives of other regions based on the one or more business rules.

At step 412, the transformed data and the one or more defined rules are pushed to the one or more mobile devices. In an embodiment of the present invention, the transformed data and the one or more defined rules are pushed based on a request from the one or more mobile devices. In an embodiment of the present invention, the transformed data and the one or more defined rules are pushed using a Representational State Transfer (REST) protocol. Further, the one or more mobile devices receive and locally store the transformed data and the one or more defined rules. In an embodiment of the present invention, the one or more mobile devices comprise a client Software Development Kit (SDK) which facilitates communication with the middleware server and receives and stores the transformed data and the one or more defined rules.

At step 414, the transformed data is rendered on the one or more mobile devices by applying the one or more pushed rules and one or more contextual rules. In an embodiment of the present invention, the one or more pushed rules comprise one or more generic rules. The one or more generic rules are used for, but not limited to, generating presentation layer, compressing data, filtering data, changing data synchronization priorities based on bandwidth availability, extending enterprise applications and mobile device capabilities, facilitating interaction between two or more enterprise applications and two or more mobile devices using the enterprise application, invoking one enterprise application through another enterprise application and passing information between two or more enterprise applications.

The one or more generic rules pertaining to generating presentation layer are used to build user interface of the one or more enterprise applications and rendering the transformed data on the one or more mobile devices. In an exemplary embodiment of the present invention, rich user interface components are used for building the user interface of the one or more enterprise applications if the one or more mobile devices are connected to a high bandwidth network based on a corresponding rule related to presentation layer generation.

In an embodiment of the present invention, the client SDK within the one or more mobile devices captures device context parameters, application context parameters, rule context parameters and security context parameters to create the one or more contextual rules. The one or more contextual rules are used by the client SDK to render the transformed data which is contextually relevant on the one or more mobile devices. The one or more contextual rules also facilitate the developer to optimally leverage device capabilities with minimal coding efforts. In an embodiment of the present invention, the device context parameters include, but not limited to, device location, device coordinates, distance from specified location, time zone, device type, device Operating System (OS), device OS version, device manufacturer, device International Mobile Station Equipment Identity (IMEI) number, device ID, device usage, network type and network carrier. In an embodiment of the present invention, the one or more contextual rules include, but not limited to, enabling or disabling application functionalities based on device location, device type and device OS, prioritizing data synchronization based on device network connectivity, enabling or disabling application libraries based on device type and device OS and performing one or more actions based on device location.

The client SDK provides additional information along with the transformed data to the one or more end users via the one or more enterprise applications. The additional information includes, but not limited to, data associated with various mobile device functionalities such as, but not limited to, Global Positioning System (GPS), augmented reality, camera and maps to facilitate the one or more end users in effective decision making. The client SDK also supplements the transformed data with additional information from the one or more external systems such as, but not limited to, World Wide Web to provide more meaningful information to the one or more end users. In an embodiment of the present invention, the additional information from the one or more external systems include, but not limited to, maps, weather updates, traffic updates, stock updates and web queries.

At step 416, the one or more end users update the rendered data on the one or more mobile devices via the enterprise application. The one or more end users may update and validate the rendered data, even if the one or more mobile devices are offline and not connected to the network, by applying the one or more business rules stored on the one or more mobile devices. In an embodiment of the present invention, the one or more business rules reside as rules templates within the client SDK. Further, the stored rules templates create dynamic business data validation rules for validating the transformed data received from the middleware server. The dynamic business data validation rules facilitate validating the transformed data at the one or more mobile devices thereby ensuring that the enterprise application need not send the data validation requests to the one or more enterprise systems.

At step 418, the transformed data updated by the one or more end users, the additional information associated with the various mobile device functionalities and the additional information from the one or more external systems is synchronized with the data present in the middleware server when the one or more mobile devices are online and connected to the network. Once the middleware server is synchronized with the one or more mobile devices, the middleware server updates the one or more enterprise systems.

Figure 5:
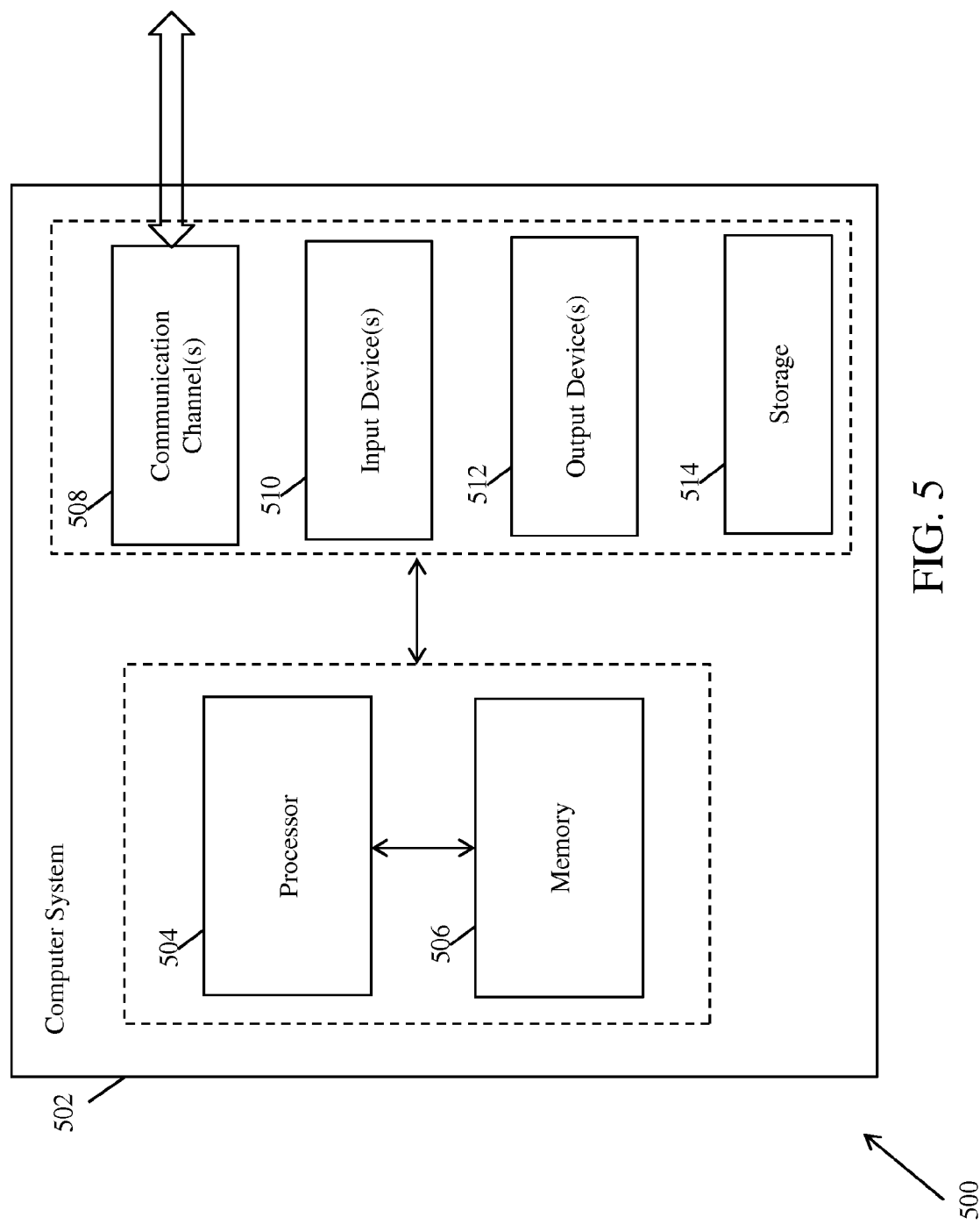
FIG. 5 illustrates an exemplary computer system for aggregating and providing data from enterprise systems to mobile devices, in accordance with an embodiment of the present invention.

FIG. 5 illustrates an exemplary computer system for aggregating and providing data from enterprise systems to mobile devices, in accordance with an embodiment of the present invention.

The computer system 502 comprises a processor 504 and a memory 506. The processor 504 executes program instructions and may be a real processor. The processor 504 may also be a virtual processor. The computer system 502 is not intended to suggest any limitation as to scope of use or functionality of described embodiments. For example, the computer system 502 may include, but not limited to, a general-purpose computer, a programmed microprocessor, a micro-controller, a peripheral integrated circuit element, and other devices or arrangements of devices that are capable of implementing the steps that constitute the method of the present invention. In an embodiment of the present invention, the memory 506 may store software for implementing various embodiments of the present invention. The computer system 502 may have additional components. For example, the computer system 502 includes one or more communication channels 508, one or more input devices 510, one or more output devices 512, and storage 514. An interconnection mechanism (not shown) such as a bus, controller, or network, interconnects the components of the computer system 502. In various embodiments of the present invention, operating system software (not shown) provides an operating environment for various softwares executing in the computer system 502, and manages different functionalities of the components of the computer system 502.

The communication channel(s) 508 allow communication over a communication medium to various other computing entities. The communication medium provides information such as program instructions, or other data in a communication media. The communication media includes, but not limited to, wired or wireless methodologies implemented with an electrical, optical, RF, infrared, acoustic, microwave, bluetooth or other transmission media.

The input device(s) 510 may include, but not limited to, a keyboard, mouse, pen, joystick, trackball, a voice device, a scanning device, or any another device that is capable of providing input to the computer system 502. In an embodiment of the present invention, the input device(s) 510 may be a sound card or similar device that accepts audio input in analog or digital form. The output device(s) 512 may include, but not limited to, a user interface on CRT or LCD, printer, speaker, CD/DVD writer, or any other device that provides output from the computer system 502.

The storage 514 may include, but not limited to, magnetic disks, magnetic tapes, CD-ROMs, CD-RWs, DVDs, flash drives or any other medium which can be used to store information and can be accessed by the computer system 502. In various embodiments of the present invention, the storage 514 contains program instructions for implementing the described embodiments.

The present invention may suitably be embodied as a computer program product for use with the computer system 502. The method described herein is typically implemented as a computer program product, comprising a set of program instructions which is executed by the computer system 502 or any other similar device. The set of program instructions may be a series of computer readable codes stored on a tangible medium, such as a computer readable storage medium (storage 514), for example, diskette, CD-ROM, ROM, flash drives or hard disk, or transmittable to the computer system 502, via a modem or other interface device, over either a tangible medium, including but not limited to optical or analogue communications channel(s) 508. The implementation of the invention as a computer program product may be in an intangible form using wireless techniques, including but not limited to microwave, infrared, bluetooth or other transmission techniques. These instructions can be preloaded into a system or recorded on a storage medium such as a CD-ROM, or made available for downloading over a network such as the internet or a mobile telephone network. The series of computer readable instructions may embody all or part of the functionality previously described herein.

The present invention may be implemented in numerous ways including as an apparatus, method, or a computer program product such as a computer readable storage medium or a computer network wherein programming instructions are communicated from a remote location.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention as defined by the appended claims.

We claim:

1. A system for aggregating and providing data from one or more enterprise systems to one or more mobile devices, the system comprising:
one or more enterprise systems configured to store data pertaining to one or more enterprises;
a middleware server, in communication with one or more mobile devices via a communication network, configured to:
connect with the one or more enterprise systems based on a predefined information architecture;
extract the data from the one or more connected enterprise systems;
transform the extracted data into one or more mobile compatible formats; and
send the transformed data to the one or more mobile devices, wherein the transformed data is compressed and filtered when the one or more mobile devices are communicating with the middleware server over a first bandwidth, further wherein transformed data is presented on the one or more mobile devices using rich user interface components when the one or more mobile devices are communicating with the middleware server over a second bandwidth such that the second bandwidth is higher than the first bandwidth; and
the one or more mobile devices, wherein each of the one or more mobile devices comprises a client Software Development Kit (SDK) configured to:
render the received transformed data to one or more users;
locally store the transformed data within the one or more mobile devices; and
facilitate the one or more users to update and view the locally stored transformed data when the one or more mobile devices are not connected to the middleware server via the communication network; and
synchronize the locally stored updated data by sending asynchronous updates to the middleware server when the one or more mobile devices connect to the network.

2. The system of claim 1, wherein the middleware server is further configured to define one or more business rules and one or more generic rules, wherein the one or more business rules facilitate validation of the transformed data, wherein the one or more generic rules facilitate at least one of: generating presentation layer, compressing data, filtering data, changing data synchronization priorities based on bandwidth availability, extending enterprise applications and mobile device capabilities, facilitating interaction between two or more enterprise applications and two or more mobile devices using the enterprise application, invoking one enterprise application through another enterprise application and passing information between two or more enterprise applications.

3. The system of claim 2, wherein the middleware server is further configured to send at least one of: the one or more defined business rules and the one or more defined generic rules to the one or more mobile devices.

4. The system of claim 1, wherein the transformed data is sent to the one or more mobile devices after applying the one or more defined business rules and the one or more defined generic rules.

5. The system of claim 1, wherein each of the one or more mobile devices comprises a client Software Development Kit (SDK) configured to:
receive the transformed data, the one or more defined business rules and the one or more defined generic rules from the middleware server;
render the transformed data on the one or more mobile devices by applying the one or more defined generic rules and one or more contextual rules;
facilitate one or more end users to update the rendered data;
validate the rendered data using the one or more received business rules; and synchronize the updated data with data present on the middleware server.

6. The system of claim 5, wherein the one or more contextual rules are created by capturing at least one of: device context parameters, application context parameters, rules context parameters and security context parameters and further wherein the one or more contextual rules facilitate rendering contextually relevant data on the one or more mobile devices.

7. The system of claim 5, wherein rendering the transformed data on the one or more mobile devices further comprises rendering additional information along with the transformed data, wherein the additional information comprises at least one of: data associated with mobile device functionalities and data from one or more external sources.

8. The system of claim 1, wherein the middleware server transforms the extracted data by parsing the extracted data and processing the parsed data to obtain the one or more mobile compatible formats.

9. The system of claim 1, wherein the one or more mobile compatible formats include at least a JavaScript Object Notation (JSON) format.

10. A system for aggregating and providing data from one or more enterprise systems to one or more mobile devices, the system comprising:
a Central Processing and Design Module (CPDM) configured to connect with the one or more enterprise systems based on a predefined information architecture;
an integration server, in communication with the CPDM, configured to extract the data from the one or more connected enterprise systems;
a transformation engine, within the CPDM, configured to transform the extracted data into one or more mobile compatible formats;
a cache server, in communication with the CPDM, configured to send the transformed data to the one or more mobile devices via a communication network, wherein the transformed data is compressed and filtered when the one or more mobile devices are communicating with the middleware server over a first bandwidth, further wherein transformed data is presented on the one or more mobile devices using rich user interface components when the one or more mobile devices are communicating with the middleware server over a second bandwidth such that the second bandwidth is higher than the first bandwidth, further wherein each of the one or more mobile devices comprises a client Software Development Kit (SDK) configured to:
render the received transformed data to one or more users;
locally store the transformed data within the one or more mobile devices; and
facilitate the one or more users to update and view the locally stored transformed data when the one or more mobile devices are not connected to the middleware server via the communication network and;
synchronize the locally stored updated data by sending asynchronous updates to the middleware server when the one or more mobile devices connect to the network.

11. A computer-implemented method for aggregating and providing data from one or more enterprise systems to one or more mobile devices, via program instructions stored in a memory and executed by a processor, the computer-implemented method comprising:
connecting one or more enterprise systems to a middleware server based on a predefined information architecture;
extracting data from the one or more connected enterprise systems;
transforming the extracted data into one or more mobile compatible formats;
sending the transformed data to the one or more mobile devices via a communication network, wherein the transformed data is compressed and filtered when the one or more mobile devices are communicating with the middleware server over a first bandwidth, further wherein transformed data is presented on the one or more mobile devices using rich user interface components when the one or more mobile devices, comprising a client Software Development Kit (SDK), are communicating with the middleware server over a second bandwidth such that the second bandwidth is higher than the first bandwidth; and
rendering the received transformed data on the one or more mobile devices, via the SDK;
storing the transformed data locally within the one or more mobile devices, via the SDK;
facilitating the one or more users to update the locally stored transformed data, via the SDK;
facilitating the one or more users to view the updated transformed data when the one or more mobile devices are not connected to the middleware server via the communication network, via the SDK; and
synchronizing the locally stored updated data by sending asynchronous updates to the middleware server when the one or more mobile devices connect to the network, via the SDK.

12. The computer-implemented method of claim 11 further comprising defining one or more business rules and one or more generic rules, wherein the one or more business rules facilitate validation of the transformed data, wherein the one or more generic rules facilitate at least one of: generating presentation layer, compressing data, filtering data, changing data synchronization priorities based on bandwidth availability, extending enterprise applications and mobile device capabilities, facilitating interaction between two or more enterprise applications and two or more mobile devices using the enterprise application, invoking one enterprise application through another enterprise application and passing information between two or more enterprise applications.

13. The computer-implemented method of claim 11 further comprising the step of sending the one or more business rules and the one or more generic rules to the one or more mobile devices.

14. The computer-implemented method of claim 11, wherein the transformed data is sent to the one or more mobile devices after applying the one or more defined business rules and the one or more defined generic rules.

15. The computer implemented method of claim 11 further comprising:
receiving the transformed data, the one or more business rules and the one or more generic rules by the one or more mobile devices;
rendering the transformed data by applying the one or more generic rules and one or more contextual rules;
facilitating one or more end users to update the rendered data;
validating the rendered data using the one or more received business rules; and synchronizing the updated data with data present on the middleware server.

16. The computer-implemented method of claim 15, wherein the one or more contextual rules are created by capturing at least one of: device context parameters, application context parameters, rule context parameters and security context parameters by the one or more mobile devices and further wherein the one or more contextual rules facilitate rendering contextually relevant data on the one or more mobile devices.

17. The computer-implemented method of claim 15, wherein rendering the transformed data comprises rendering additional information along with the transformed data, wherein the additional information comprises at least one of: data associated with mobile device functionalities and data from one or more external systems.

18. The computer-implemented method of claim 15, wherein the rendered data is validated using the one or more received business rules.

19. The computer-implemented method of claim 11, wherein the step of transforming the extracted data comprises parsing the extracted data and processing the parsed data to obtain the one or more mobile compatible formats.

20. A computer program product for aggregating and providing data from one or more enterprise systems to one or more mobile devices, the computer program product comprising: a non-transitory computer-readable medium having computer-readable program code stored thereon, the computer-readable program code comprising instructions that when executed by a processor, cause the processor to:
    connect one or more enterprise systems to a middleware server based on a predefined information architecture;
    extract data from the one or more connected enterprise systems;
    transform the extracted data into one or more mobile compatible formats;
    send the transformed data to the one or more mobile devices via a communication network, wherein the transformed data is compressed and filtered when the one or more mobile devices are communicating with the middleware server over a first bandwidth, further wherein transformed data is presented on the one or more mobile devices using rich user interface components when the one or more mobile devices, comprising a client Software Development Kit (SDK), are communicating with the middleware server over a second bandwidth such that the second bandwidth is higher than the first bandwidth; and
    render the received transformed data on the one or more mobile devices via the SDK;
    store the transformed data locally within the one or more mobile devices, via the SDK;
    facilitate the one or more users to update the locally stored transformed data, via the SDK;
    facilitate the one or more users to view the updated transformed data when the one or more mobile devices are not connected to the middleware server via the communication network, via the SDK; and
    synchronize the locally stored updated data by sending asynchronous updates to the middleware server when the one or more mobile devices connect to the network, via the SDK.

* * * * *